(12) United States Patent
Loison et al.

(10) Patent No.: US 11,052,505 B2
(45) Date of Patent: Jul. 6, 2021

(54) METHOD FOR SHARPENING A MACHINING TIP AND CORRESPONDING SHARPENED TIP

(71) Applicant: Mecachrome France, Amboise (FR)

(72) Inventors: Ludovic Loison, Tours (FR); Arnaud De Ponnat, Vouvray (FR); Olivier Martin, Saint Genevieve des Bois (FR)

(73) Assignee: Mecachrome France, Amboise (FR)

( * ) Notice: Subject to any disclaimer, the term of this patent is extended or adjusted under 35 U.S.C. 154(b) by 391 days.

(21) Appl. No.: 16/066,071

(22) PCT Filed: Dec. 29, 2016

(86) PCT No.: PCT/FR2016/053684
§ 371 (c)(1),
(2) Date: Jun. 26, 2018

(87) PCT Pub. No.: WO2017/115057
PCT Pub. Date: Jul. 6, 2017

(65) Prior Publication Data
US 2019/0009383 A1    Jan. 10, 2019

(30) Foreign Application Priority Data
Dec. 29, 2015    (FR) ...................................... 1563439

(51) Int. Cl.
*B24B 3/34*    (2006.01)
*B23B 27/16*    (2006.01)
(Continued)

(52) U.S. Cl.
CPC .............. *B24B 3/343* (2013.01); *B23B 27/14* (2013.01); *B23B 27/16* (2013.01); *B23C 5/20* (2013.01)

(58) Field of Classification Search
CPC ......... B24B 3/343; B23B 27/14; B23B 27/16; B23C 5/20
See application file for complete search history.

(56) References Cited

U.S. PATENT DOCUMENTS

| | | | | |
|---|---|---|---|---|
| 2005/0239384 A1* | 10/2005 | Eggart | .................. | B24B 41/066 451/364 |
| 2007/0248424 A1* | 10/2007 | Omori | ..................... | B23C 5/202 407/113 |

(Continued)

FOREIGN PATENT DOCUMENTS

| | | |
|---|---|---|
| CH | 652063 A5 | 10/1985 |
| JP | S54119189 A | 9/1979 |

(Continued)

OTHER PUBLICATIONS

Jan. 1, 2007-Jan Dr. Ing. Gabler et al, "Selbstcharfende Rodentics-Zerspanungswerkzeuge-Rattenzahne als Vorbild", XP055037132, pp. 425-426.

(Continued)

*Primary Examiner* — Dung Van Nguyen
(74) *Attorney, Agent, or Firm* — Banner & Witcoff, Ltd.

(57) ABSTRACT

The present invention concerns a method for sharpening a worn removable machining tip (3) and the corresponding sharpened tip. The tip having a first cutting edge (7) damaged after a first use (u1), said tip having, in the state prior to the use of same, specific dimensional and geometrical parameters within a defined tolerance range and said first undamaged cutting edge (7) having a defined sharpness, the method involves sharpening the cutting face (9) by removing material from said cutting face on said first damaged edge (7), in order to make said tip (3) match said specific dimensional and geometrical parameters within said defined tolerance range, having a second cutting edge (7') of said defined sharpness.

8 Claims, 4 Drawing Sheets

(51) Int. Cl.
 *B23C 5/20* (2006.01)
 *B23B 27/14* (2006.01)

(56) References Cited

U.S. PATENT DOCUMENTS

2015/0298215 A1* 10/2015 Bjormander .......... C23C 28/044
 407/115
2016/0016232 A1* 1/2016 Edman .................. B23B 27/145
 29/557

FOREIGN PATENT DOCUMENTS

| | | |
|---|---|---|
| JP | H10180507 A | 7/1998 |
| WO | 95/01239 A1 | 1/1995 |

OTHER PUBLICATIONS

Dec. 31, 2011—Peter Kuhmstedt et al, "3D—Schneidkantenvermessung Von Prazisionsschneidwerkzeugen 3D Measurement of Cutting Edges on Prevision Cutting Tools," Annual Report, pp. 40-41.
Apr. 4, 2017—International Search Report of PCT/FR2016/053684.
English translation of Mar. 23, 2021 Notification of Rejection for Rejection in JP application No. 2018-533921.
Computer-generated translation of Applicant Written Opinion filed Dec. 25, 2020 in JP application No. 2018-533921.
English translation of Claim amendments filed Dec. 25, 2020 in JP application No. 2018-533921.
English translation of Oct. 6, 2020 Notification of Reasons for Rejection in JP application No. 2018-533921.

* cited by examiner

METHOD FOR SHARPENING A MACHINING TIP AND CORRESPONDING SHARPENED TIP

The present invention relates to a method for sharpening a worn removable machining insert (or indexable tool), said insert having a damaged or worn edge after use.

It also proposes a sharpened insert obtained with such a method.

It finds a particularly important but not exclusive application in the field of disposable and removable inserts. For most of the time, disposable and removable inserts are not sharpenable by definition.

In practice, however, there does exist a solution consisting in recycling them in other forms and/or in other industries.

Specifically, it is known to reuse these inserts converted into another removable machining insert whose shape is inscribed within the initial shape of the original insert.

Such a reuse is justified when the material constituting the insert has a significant cost.

A reconditioning method will thus be applied to an insert of cylindrical shape by successively recutting it to ever smaller diameter and thickness dimensions while being inscribed within the previous dimensions of the insert before wear.

The successive conversions then allow an economic saving in the reuse of the material, but require, on the one hand, there to be a need for such inserts of more reduced dimensions and, on the other hand, require them to be stored and/or them to be transported to the desired location, which generates additional constraints and costs.

Specifically, in the case of such reconditionings, the new insert no longer meets the dimensional and geometric requirements of the initial model.

The surfaces associated with the positioning and with the retention of the insert on its tool holder support are in effect modified, which results in a mounting on a different tool generally situated on another site.

Another solution consists in removing the insert, in resharpening it at the insert flank to reestablish the cutting edge, and to refit it with the difficulties associated with the correct repositioning to comply with the tolerances.

Document CH 652 063 describes a method for the post-machining of inserts in which the removal of material is carried out in a staged manner, the sharpened surface being parallel to the upper face or the lower face of the insert.

This method requires that the inserts be removed before the sharpening can be performed. Moreover, the sharpening operation requires a specific insert holder.

Moreover, this method does not make it possible to comply with the specific dimensional and geometric parameters of the inserts.

The present invention aims to provide a method and a sharpened insert better meeting the requirements of practice than those previously known, in particular in that it allows a plurality of uses of the same insert on the same tool holder before it is disposed of, and does so in a simple and effective manner, thereby generating significant cost and time savings in the use of the tool.

With the invention, a greater number of sharpenings than customarily carried out at the flank of inserts is also observed (two to ten times more).

Also, the present invention allows sharpening without removing the insert from its tool holder. In the case of a plurality of inserts on the same tool holder, which is frequent, they will be able to be ground with the same tolerances, since uncertainties due to their repositioning are then overcome, which constitutes an additional advantage.

Moreover, the invention makes it possible to save all the contact parts between the body of the tool holder and the means for clamping or gripping with the insert. The retention of the then resharpened worn insert on the body of the tool holder therefore allows a mounting at the place of the worn insert, the sharpened insert becoming the equivalent of a fresh new insert.

To achieve this, the invention starts in particular from the idea of sharpening only the rake face of the insert, that is to say with a grinding tool which comes into contact with the rake face, this taking place as many times as possible and as long as the level of wear remains compatible with the requirements of the model whatever the shape thereof.

Thus, each sharpening operation makes it possible to generate a new rake face and a new cutting edge by attacking a part of the flank face.

With this aim, the invention proposes in particular a method for sharpening a worn removable machining insert having a first cutting edge damaged after a first use, said insert having, in the state prior to its use, specific dimensional and geometric parameters within a defined tolerance range and said first undamaged cutting edge (or initial edge) of defined sharpness, characterized in that the sharpening is carried out on the rake face by removing material from said rake face on said first damaged edge, in order to make said insert correspond to said specific dimensional and geometric parameters within said defined tolerance range, while having a second cutting edge of said defined sharpness.

The specific dimensional and geometric parameters of the insert are, for a defined geometric insert shape, the wedge angle $\beta$ of the insert, the relief angle $\alpha$ of the insert and, when the insert is associated with a rotating tool, the rake angle $\gamma_f$ and the effective radius $R_\beta$ between the flank face (intersection with the rake face and/or the wear) and the axis of rotation of the rotating tool.

The ranges of tolerances are for their part a function of the initial manufacture of the insert and of the accepted dimensional tolerances on the components machined with said insert.

They are therefore determined case by case so as to be within the scope of a person skilled in the art.

Advantageously, with the insert having the second cutting edge damaged after a second use, the rake face is sharpened a second time by removing material from said rake face on said second damaged edge, in order to make said insert correspond to said specific dimensional and geometric parameters within said defined tolerance range, while having a third cutting edge of said defined sharpness.

In other words, the operation of sharpening the rake face is repeated at least twice during the life of the insert.

Also advantageously, with the insert having a third cutting edge damaged after a third use, the rake face is sharpened a third time by removing material from said rake face on said damaged third edge, in order to make said insert correspond to said specific dimensional and geometric parameters within said defined tolerance range, while having a fourth cutting edge of said defined sharpness.

In other words, the operation of sharpening the rake face is repeated at least three times during the life of the insert.

In advantageous embodiments, recourse is moreover and/or additionally had to one and/or another of the following provisions:

with the insert being able to be fastened by a fastening face to a tool body rotatable about an axis and comprising a rake face and a flank face forming a wedge angle β between them before wear, the edge of the apex of the angle β forming the cutting edge and defining, with the axis of rotation of the tool body, the nominal effective radius of the tool of length R+/−x, x being the use tolerance of the insert for a defined machining of a component, the rake face is sharpened by removing material from said rake face, in order to recreate the cutting edge while defining an effective radius remaining within the tolerance R+/−x. For example, there is provided a radius R of between 6 mm and 2000 mm with a tolerance x within a range from 0.025 mm to 0.38 mm;

the rake face is sharpened such that the cutting edge has an edge sharpness which is less than 10 microns;

the specific dimensional and geometric parameters comprise the following parameters:

$\gamma_f$: rake angle

β: wedge angle of the insert

α: relief angle of the insert.

The rake angle $\gamma_f$ is kept within a maximum tolerance of more or less 30° with respect to the initial rake angle.

In a particularly advantageous embodiment, it is possible to keep the rake angle within a tolerance of more or less 5° with respect to the initial rake angle, this tolerance being able to range up to more or less 1°.

Such a tolerance is kept by the modification of the wedge angle β during the sharpening of the rake face.

Advantageously, the wedge angle β is modified following the sharpening of the rake face, in order to keep the same rake angle $\gamma_f$ or to improve the service life performance and/or productivity performance of the insert in use.

The invention also proposes a method for sharpening removable inserts of a tool, as described above, characterized in that, with the tool comprising a plurality of inserts, for example at least three inserts, advantageously at least six inserts, the inserts are sharpened without removing said inserts from the tool.

The invention also proposes a machining insert having a cutting edge with a sharpness of less than 10 microns, a protective coating on its flank face and no protective coating on its rake face at and in the region situated close to its edge.

What is meant by region is an area of the order of a few square millimeters, of 1 to 10 square cm, adjoining the cutting line.

It will be recalled that, in order to slow down the rate of damage of the insert (or tool), one or more layers of materials for protecting the tool are applied to its surface, these layers constituting a coating.

In the prior art, since the flank face is the one which is cut, its coating is generally torn off and the tool must consequently necessarily undergo a coating operation after having been sharpened or reconditioned.

This is not the case with the invention, in particular when a coating of large thickness (e≥2 μm) is applied to the flank face or faces of the tool.

Advantageously, the insert comprises a coating with a thickness which is greater than or equal to 5 μm on its flank face, such a thickness making it possible to always have a coated edge after sharpening without having to renew the coating.

The invention will be better understood on reading the description which follows of embodiments given below by way of nonlimiting example.

The description refers to the drawings which accompany it, in which.

Figures 3, 3A:
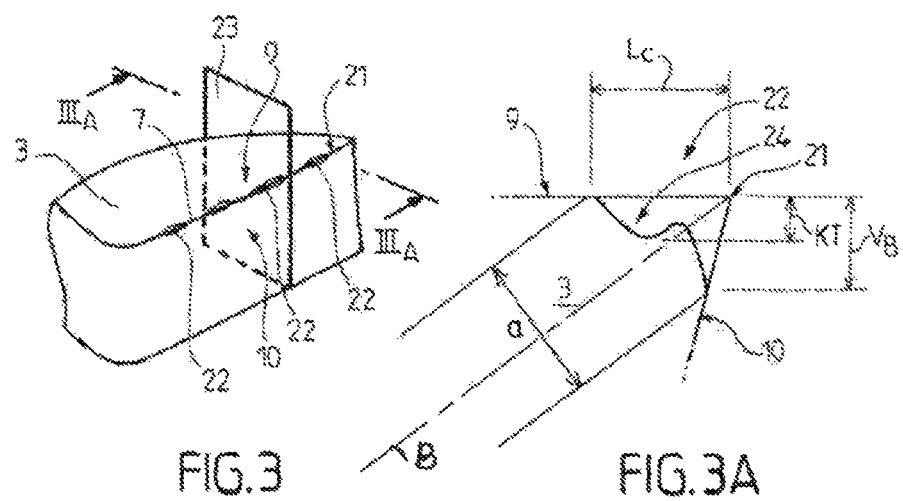

FIGS. 3 and 3A schematically show the parameters for characterizing a cutting edge wear.

Figure 4:
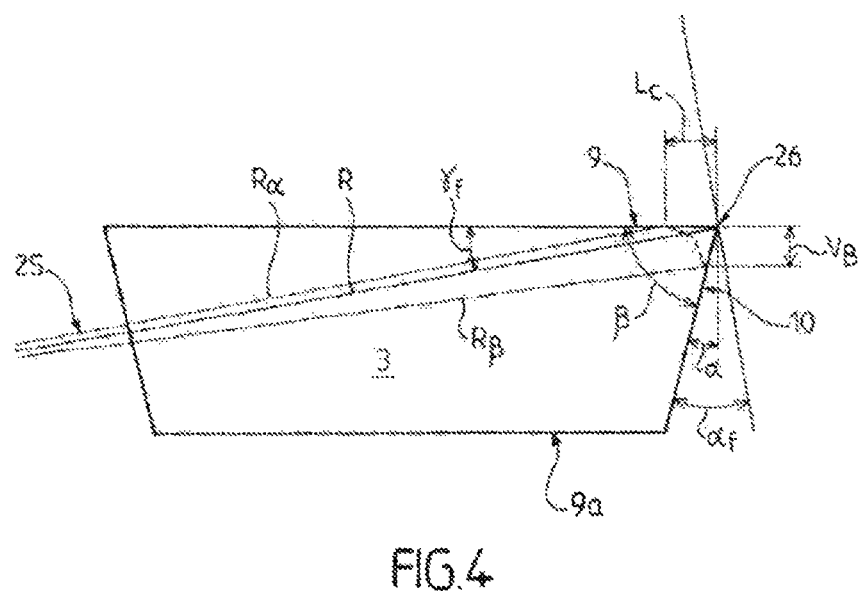

FIG. 4 shows for its part the cutting parameters before sharpening as defined in relation with the straight line which passes through the axis of rotation of the tool body and the active contact point of the insert.

Figure 4A:
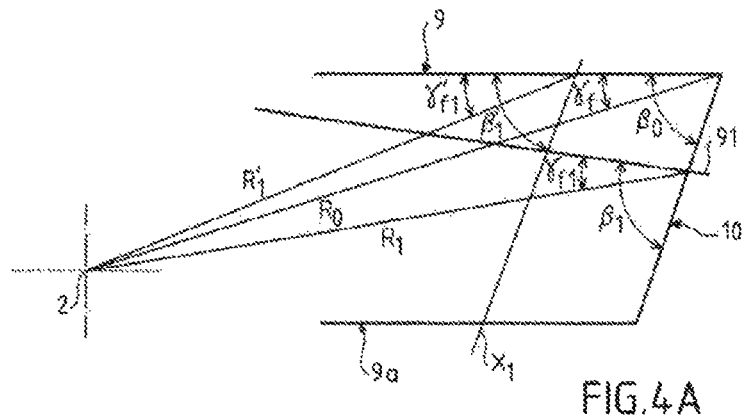

FIG. 4A is a view similar to FIG. 4 which illustrates the cutting parameters after sharpening of the rake face (carried out at an inclination with respect to the rake face) and of the flank face.

Figure 5:
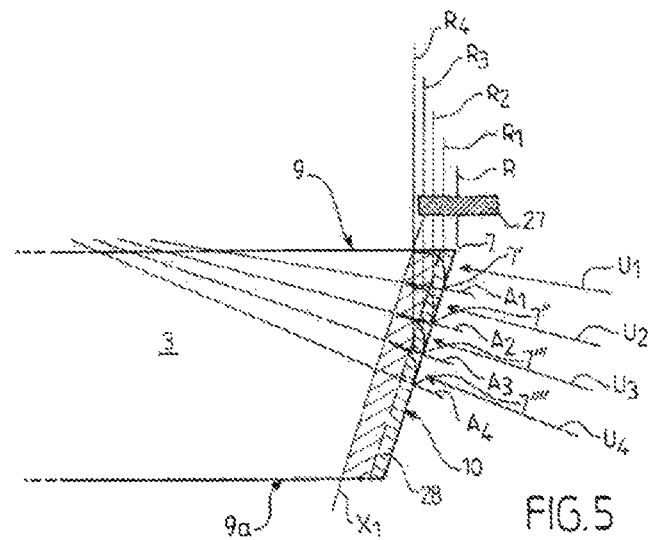

FIG. 5 illustrates the sharpening steps according to the embodiment of the method of the invention more particularly described here.

Figure 6:
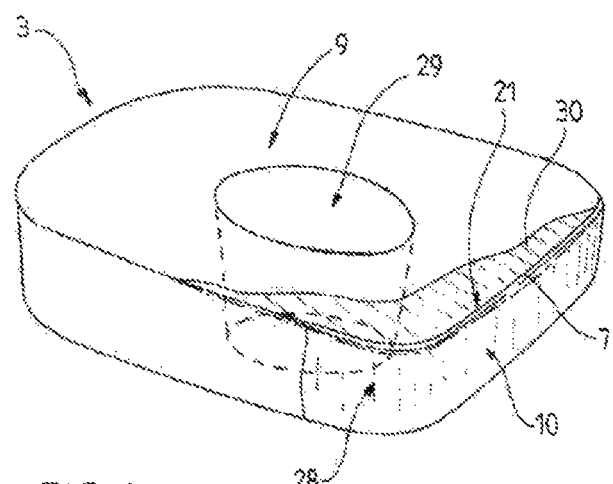

FIG. 6 shows a perspective of a sharpened insert according to an embodiment of the invention.

Figure 7:
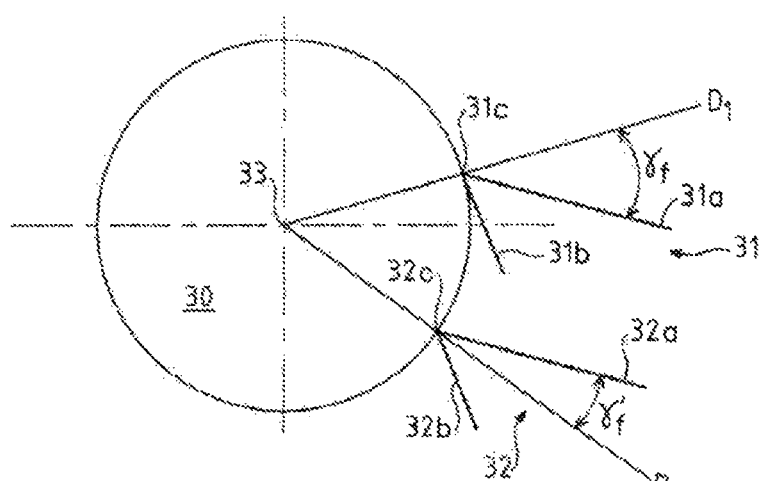

FIG. 7 schematically illustrates the machining of a rotating component by a fixed tool.

In the text which follows, the same reference numbers will be used to designate the same elements or similar elements.

Figure 1:
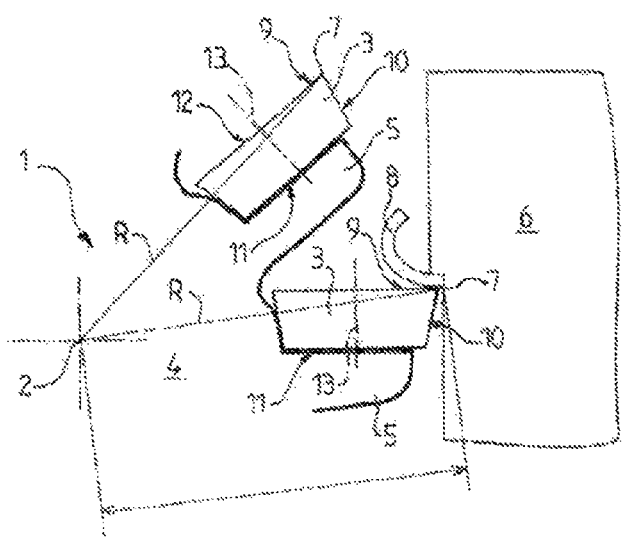
FIG. 1 is a partial basic diagram schematically showing the machining of a component by a tool holder/insert assembly which can rotate about an axis.

FIG. 1 schematically and partially depicts a tool 1, which is rotatable about an axis 2, comprising a series of removable inserts 3, for example eleven inserts (not shown in full), radially distributed regularly over the periphery of the tool. These inserts 3 are mounted in a removable manner on a tool body 4 via parts or shoulders for fastening the inserts 3.

The inserts 3 are arranged to attack the component 6 via their respective cutting edge 7, generating chips 8.

In a known manner, the sum of the manufacturing tolerances of the body of the tool or tool holder and of the inserts determines the overall tolerance of the tool and more particularly its effective radius R delimited on one side by the axis 2 and on the other side by the cutting edge 7.

More precisely, the active areas of the tool are constituted by the, for example substantially rectangular, rake face 9 in contact with the chip and the likewise polygonal flank face 10 in contact with the component.

Each insert 3 and the part 5 of the tool body, which are opposite one another, additionally comprise functional areas, namely a junction area 11 for positioning the insert on the tool holder (or fastening face) and an opposite area 12 by which the insert is gripped on the tool holder, for example via screws 13 symbolized in dot-dash line in the figure.

It is known that the interface between the active part of the insert and the component/chip pair is subjected to large mechanical, thermal and chemical stresses causing damage or wear thereof.

Figure 2:
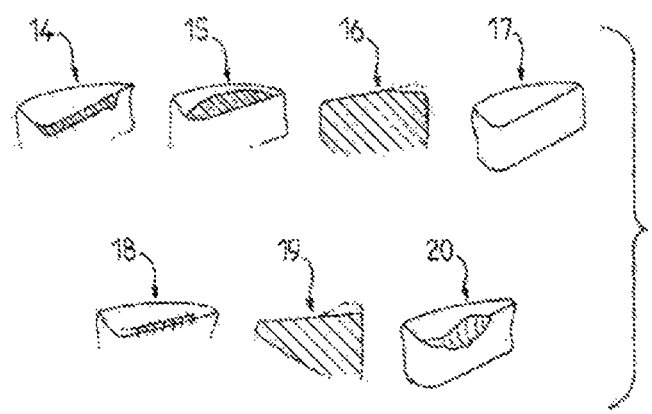
FIG. 2 illustrates various types of wear on the cutting line of inserts which can be resharpened with the method according to the invention.

FIG. 2 depicts various examples of types of wear, namely a flank wear 14, a crater wear 15, a wear by plastic deformation 16, a wear by spalling 17, a comb wear 18, a wear by a built-up edge 19 or else a wear by rupture 20.

All these types of wear can be schematically illustrated and characterized as explained with reference to FIG. 3.

Thus, the insert 3 which comprises the worn cutting edge 7 on its cutting line 21 while having damaged parts 22 with crater and flank wear will be able to be specified and/or defined in a plane 23 perpendicular to the cutting line 21 by the following values (cf. FIG. 3A):

the depth of the crater 24: KT the damaged edge segment at the flank 10: $V_B$ the length of contact with the chip: $L_c$.

Also depicted in FIG. 3A is the edge sharpness a for the worn cutting edge. The edge sharpness represents the width of the shape of the apex of the dihedron, here constituted by the worn rake 9 and flank 10 faces, taken orthogonally to the bisector B of this dihedron.

The cutting parameters of an insert 3 are for their part defined with reference to FIG. 4 and in relation to the straight line 25 defining the effective radius R of the tool, which therefore passes through the axis 2 of rotation of the tool body and the active contact point 26 of the insert, as follows:

R: effective new tool radius
$\gamma f_f$: rake angle of the new tool
$\alpha_f$: relief angle of the new tool
β: wedge angle of the new insert
α: relief angle of the new insert
$R_\alpha$: effective radius of the point of intersection between the damaged edge and rake face
$L_c$: damaged edge segment on the rake face of the insert
Rβ: effective radius of the point of intersection between the damaged edge and the flank face
$V_b$: damaged edge segment on the flank face of the insert.

FIG. 4A is a view similar to FIG. 4 which illustrates the following parameters:

$R_0$: effective new tool radius;
$\gamma_f$: rake angle of the new tool;
$\beta_0$: wedge angle of the new insert;
$R_1$: effective radius of the tool after the first sharpening of the rake face, carried out along a sharpening line inclined by a nonzero angle with respect to the rake face;
$\gamma_{f1}$: rake angle of the tool after the first sharpening of the rake face;
$\beta_1$: wedge angle of the insert after the first sharpening of the rake face;
$R'_1$: effective radius of the tool after a first sharpening of the flank face;
$\gamma'_{f1}$: rake angle after the first sharpening of the flank face;
$\beta'_1$: wedge angle of the insert after the first sharpening of the flank face.

This figure shows that, during the operation of sharpening of the rake face, the inclination of the new rake face 91, with respect to the rake face 9 or the opposite face 9a, can be chosen such that its rake angle $\gamma_{f1}$ is substantially equal to the rake angle $\gamma_f$ of the new tool. This is obtained by modifying the wedge angle $\beta_1$ which is greater than the wedge angle β.

The increase in the wedge angle $\beta_1$ is illustrated for the following data:

$\alpha_0=10°$; $\beta_0=80°$; $\alpha_{0f}=15°$; $R_0=16$ mm; $L_c=0.2$ mm; $V_B=0.2$ mm.

In this case, $\beta_1$ is increased by 0.71° with respect to $\beta_0$ to keep the rake angle in a tolerance of more or less 5° and even of more or less 1° ($\gamma_{f1}$ substantially equal to $\gamma_f$).

This FIG. 4A also shows that, when the flank face 10 is sharpened parallel to the initial inclination of this face (along the cutting line $X_1$), the wedge angle $\beta'_1$ is kept but the rake angle $\gamma'_{f1}$ is modified, which is prejudicial to the cutting performance. It should be noted that, if the flank face is sharpened in a nonparallel manner to the initial inclination of this flank face, the rake angle will be modified and the wedge angle likewise.

There will now be described, with reference to FIG. 5, the successive steps of the method for sharpening an insert 3 according to the embodiment more particularly described here.

More precisely, this figure shows the succession of four uses for machining $U_1$, $U_2$, $U_3$ and $U_4$ with an initial effective machining radius R, then after each sharpening $R_1$, $R_2$ and $R_3$.

Upon each machining $U_1$, $U_2$, $U_3$ and $U_4$, there is sharpened a rake face whose path in the plane is a sharpening line $A_1$, $A_2$, $A_3$ and $A_4$. Each rake face like each sharpening line is inclined by a nonzero angle with respect to the rake face 9 or the face 9a which are opposite one another (for $A_1$) or with respect to the previously sharpened rake face (for $A_2$, $A_3$, $A_4$).

The cutting edges, i.e. first initial cutting edge 7, second cutting edge 7', third cutting edge 7", fourth cutting edge 7'", etc., have the same sharpness (to match)(within the accepted tolerance).

It will be noted that the radius $R_4$ after four sharpenings (sharpening lines A1, A2, A3 and A4) of the rake face 9 is equivalent to the radius R' resulting from a single sharpening X1 (cutting line X1) of the flank face 10 with regard to an equivalent wear after use of the tool in the context of a sharpening within the tolerance range represented schematically by the rectangle 27 (R+/−x) in FIG. 5.

More precisely, it will be observed that the insert 3 can be sharpened three times in accordance with the tolerance range of the radius R, contrary to the sharpening of the flank face and to the fourth sharpening of the rake face. The removal of material after a sharpening of the flank face and a sharpening of the rake face is defined by the effective radius Ri after the i-th sharpening.

This effective radius has to be less than or equal to $R_\alpha$ in the case of a sharpening of the flank face and less than or equal to $R_\beta$ in the case of a sharpening of the rake face.

The radii $R_\alpha$ and $R_\beta$ are modeled as follows:

$$R_\beta = \sqrt{\left(\left(R - \left(\frac{V_B \times \cos(\alpha_f) \times \tan(\alpha_f)}{\cos(\alpha)}\right)\right)^2 + \left(\frac{V_B \times \cos(\alpha_f)}{\cos(\alpha)}\right)^2\right)}$$

$$R_\alpha = \sqrt{((R - L_c \times \cos(\beta + \alpha_f - \pi/2))^2 + (L_c \times \sin(\beta + \alpha_f - \pi/2))^2)}$$

Given below in the form of tables 1 and 2 are examples of numerical applications illustrating the comparative results obtained with the two types of sharpening which show the great (unexpected) advantage of the solution of the invention.

Table 1

This table 1 compares the values of $R_\alpha$ and $R_\beta$ as a function of the pair ($L_c$, $V_B$) for the initial data 1:

α=10°, β=80°, $\alpha_f$=15°, R=16 mm

| $L_C$ | $V_B$ | $R_\alpha$ | $R_\beta$ |
|---|---|---|---|
| 0.3 mm | 0.2 mm | 15.701 mm | 15.948 mm |
| 0.2 mm | 0.2 mm | 15.800 mm | 15.948 mm |
| 0.2 mm | 0.3 mm | 15.800 mm | 15.923 mm |

Table 1 shows that the radius $R_\beta$ is always greater than $R_\alpha$ and that it is therefore possible to carry out a plurality of sharpenings of the rake face before reaching the value of the effective radius obtained after a single sharpening of the flank face.

Table 2

This table gives the values of $R_\alpha$, and $R_\beta$ for a defined pair of values ($L_c$, $V_B$) and for the same effective new tool radius ($R_0$) and also the values of $R_\beta$ after successive sharpenings (i) of the rake face (with a minimal removal of material).

Initial data 2: α=10°, β=80°, $α_f$=15°, $R_0$=16 mm, $L_c$=0.2 mm, $V_B$=0.2 mm

| $R_i$ | $R_α$ | $R_β$ |
|---|---|---|
| $R_0$ = 16 mm | 15.800 mm | 15.948 mm |
| $R_1$ = 15.948 mm | not calculated | 15.897 mm |
| $R_2$ = 15.897 mm | not calculated | 15.845 mm |
| $R_3$ = 15.845 mm | not calculated | 15.794 mm |

Table 2 confirms that, with a sharpening of the rake face, a plurality of successive sharpenings (here numbering 3) can be carried out before reaching the value of the effective radius obtained after a single sharpening of the flank face.

Still with reference to FIG. 5, and to slow down the rate of damage to the tool, one or more layers of materials with higher-performance properties than those of the tool can be applied to the cutting surface. In the prior art, these layers which are referred to as coatings are generally reapplied after each sharpening.

However, within the scope of the invention, and by the prior application to a new insert of a coating 28 of large thickness to the flank face, that is to say of sufficient thickness such that there always remains a thickness (which ever decreases) in spite of the successive sharpenings of the rake face, there results a cutting edge which always remains coated after sharpening.

It will be noted that, as shown by the example in FIG. 6, the sharpening of inserts according to the invention is carried out on multiple shapes of inserts.

More precisely, FIG. 6 shows a sharpened removable insert 3 according to an embodiment of the invention that is provided with an orifice 29 for fastening to its support of the shoulder 5 type (see FIG. 1).

The insert 3 comprises a, for example substantially oval, rake face 9 and a rounded flank face 10 defining between them a cutting edge 7 which can be worn on its cutting line 21 and can have a sharpness (width of the cutting line, that is to say the width of the shape of the apex of the dihedron formed by the rake and flank faces) which is less than 10 μm after sharpening.

The dimensions and shapes of the insert are, for example, prismatic and hyperpyramidal shapes with a square, rectangular or triangular base, the diameter of the inscribed or circumscribed circle of which is commonly from 3 to 30 mm.

The rake face 9 has, at the level of the cutting line 21 and in the hatched-line region 30 in the figure, an area devoid of any protective coating, revealing the bare metal, for example tungsten carbide or steel, or an alloy of known type for the machining of metal components. The nonsharpened flank face 10 is for its part coated with a coating layer 28 with a thickness of greater than 5μ, such a thickness making it possible to always have a cutting edge 21 protected on the side of the component to be cut.

There will now be described, with reference to FIGS. 1 and 5, the implementation of a method for sharpening inserts 3 according to the embodiment of the invention more particularly described here.

Starting from a machining tool rotating about its axis 2, the component 6 is machined by removing material while creating the chips 8 which are evacuated naturally in a manner known per se. After a certain use time, which is a function of the hardness and of the length of the components to be machined, but also of the cutting inserts used, the cutting edge of the latter becomes blunt and/or deteriorates so as to have one and/or another of the defects represented in FIG. 2.

The inserts can then no longer be used without risk of damaging the components themselves. It is then appropriate to resharpen them.

The tool is then brought to a sharpening bench and, without removing the inserts, is sharpened via a sharpening tool known per se and making it possible to re-establish the sharpness of the initial inserts by eliminating and/or erasing the defects of its edge.

The fact of attacking to sharpen the rake face makes it possible, in a simple manner, by rotating the tool and without removing the inserts, to sharpen them one after the other in a repetitive and identical manner. Thus, all the inserts will regain the same effective radius $R_1$, $R_2$, $R_3$ . . . in compliance with the tolerances of the initial radius R±x.

The tool, which has therefore not been removed, is then reused once more until it is again necessary to resharpen its inserts, and so on until there is a departure from the radius tolerance. The coating of the flank face makes it possible to maintain the protection of the face in contact with the component in spite of the successive sharpenings.

At the end of these sharpenings, the insert can optionally be reused by reconditioning into an insert of overall smaller dimensions.

The invention has been described for a rotary tool holder/insert assembly.

It also applies to a fixed assembly or tool.

Thus, FIG. 7 illustrates a rotating component 30 and two tools 31, 32 which are fixed with respect to this component.

Each tool 31, 32 comprises a rake face 31a, 32a and a flank face 31b, 32b.

The rake angle of each tool is defined by the angle $γ_f$ counted between the rake face 31a, 32a of the tool and the straight line $D_1$, $D_2$ which passes through the center 33 of rotation of the component 30 and the cutting edge 31c, 32c.

In the case of the tool 31, the angle $γ_f$ is positive, and the straight line $D_1$ is outside the dihedron formed by the rake face 31a and the flank face 31b. In the case of the tool 32, the angle $γ_f$ is negative, the straight line D2 being inside the diehedron formed by the rake face 32a and the flank face 32b.

As going without saying and as is also apparent from the foregoing, the present invention is not limited to the embodiments more particularly described. By contrast, it covers all the variants thereof and in particular those where the tool is a drilling, turning or milling tool and those where the inserts are ones with different shapes and dimensions and have in particular a cutting surface of complex geometry, that is to say a cutting surface comprising faces of different orientations, be these planar or curved faces.

The invention claimed is:

1. A method for sharpening a worn removable machining insert (3) having a first cutting edge (7) damaged after a first use (u1), said insert having, in the state prior to its use, specific dimensional and geometric parameters within a defined tolerance range and said first undamaged cutting edge (7) of defined sharpness, characterized in that the sharpening is carried out on the rake face (9) by removing material from said rake face on said first damaged edge (7), a sharpening line (A1) being inclined by a nonzero angle with respect to the rake face (9), in order to make said insert (3) correspond to said specific dimensional and geometric parameters within said defined tolerance range, while having a second cutting edge (7') of said defined sharpness.

2. The method as claimed in claim 1, characterized in that, with the insert (3) having the second cutting edge (7') damaged after a second use (u2), the rake face (9) is sharpened a second time by removing material from said rake face on said second damaged cutting edge (7'), a sharpening line (A2) being inclined by a nonzero angle with respect to the previously sharpened rake face, in order to make said insert (3) correspond to said specific dimensional and geometric parameters within said defined tolerance range, while having a third cutting edge (7") of said defined sharpness.

3. The method as claimed in claim 2, characterized in that, with the insert (3) having a third cutting edge (7") damaged after a third use (U3), the rake face (9) is sharpened a third time by removing material from said rake face on said third damaged cutting edge (7"), a sharpening line (A3) being inclined by a nonzero angle with respect to the previously sharpened rake face, in order to make said insert (3) correspond to said specific dimensional and geometric parameters within said determined tolerance range, while having a fourth cutting edge (7''') of said defined sharpness.

4. The method as claimed in claim 1, characterized in that, with said insert (3) being able to be fastened by a fastening face (11) to a tool body (4) rotatable about an axis (2) and comprising a rake face (9) and a flank face (10) forming a wedge angle β between them before wear, the edge of the apex of the angle β forming the cutting edge (7', 7", 7''' . . . ) and defining, with the axis (2) of rotation of the tool body, the nominal effective radius of the tool (4) of length R+/−x, x being the use tolerance of the insert for a defined machining of a component, the rake face (9) is sharpened by removing material from said rake face, in order to recreate the cutting edge (7) while defining an effective radius remaining within the tolerance R+/−x.

5. The method as claimed in claim 1, characterized in that the rake face (9) is sharpened such that the cutting edge (7) has an edge sharpness which is less than or equal to 10 microns.

6. The method as claimed in claim 1, characterized in that the specific dimensional and geometric parameters comprise the following parameters:
   $\gamma_f$: rake angle
   β: wedge angle of the insert
   α: relief angle of the insert
   the rake angle $\gamma_f$ is kept within a tolerance of more or less 5° with respect to the initial rake angle.

7. The sharpening method as claimed in claim 6, characterized in that the wedge angle β is modified following the sharpening of the rake face, in order to keep the same rake angle $\gamma_f$ or to improve the service life performance and/or productivity performance of the insert in use.

8. The method for sharpening removable inserts for a tool (1) as claimed in claim 1, characterized in that, with the tool (1) comprising a plurality of inserts (3), the inserts are sharpened without removing said inserts from the tool.

* * * * *